US012660756B2

(12) United States Patent
  Shonk

(10) Patent No.: US 12,660,756 B2
(45) Date of Patent: Jun. 23, 2026

(54) TRAILED MOWER WITH STABILITY CONTROL

(71) Applicant: CNH Industrial America LLC, New Holland, PA (US)

(72) Inventor: Jason Shonk, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 621 days.

(21) Appl. No.: 18/100,745

(22) Filed: Jan. 24, 2023

(65) Prior Publication Data

US 2024/0244994 A1 Jul. 25, 2024

(51) Int. Cl.
| | |
|---|---|
| *A01D 67/00* | (2006.01) |
| *A01B 59/04* | (2006.01) |
| *A01B 63/32* | (2006.01) |
| *A01D 34/03* | (2006.01) |

(52) U.S. Cl.
CPC .............. *A01D 67/00* (2013.01); *A01B 59/04* (2013.01); *A01B 63/32* (2013.01); *A01D 34/032* (2013.01)

(58) Field of Classification Search
CPC ...... A01D 34/24; A01D 34/246; A01D 34/28; A01D 34/283; A01D 34/74; A01D 34/032; A01D 63/22; A01D 34/64; A01D 67/00; A01D 34/00; A01B 59/04; A01B 63/32
See application file for complete search history.

(56) References Cited

U.S. PATENT DOCUMENTS

| | | | |
|---|---|---|---|
| 3,908,345 A | 9/1975 | Oni et al. | |
| 4,050,704 A | 9/1977 | Duca et al. | |
| 4,177,625 A * | 12/1979 | Knight ................... | A01D 67/00 56/15.8 |
| 6,382,326 B1 | 5/2002 | Goins et al. | |
| 6,745,849 B2 * | 6/2004 | Guiet ................. | B60G 17/0277 172/395 |

(Continued)

FOREIGN PATENT DOCUMENTS

| | | |
|---|---|---|
| DE | 102013111426 A1 | 5/2014 |
| EP | 0149870 A1 | 7/1985 |
| EP | 0769895 B1 | 8/1998 |

OTHER PUBLICATIONS

The Partial European Search Report issued Jun. 5, 2024, by the European Patent Office in corresponding European Patent Application No. 24 153 549.1. (12 pages).

*Primary Examiner* — Brad Harcourt
(74) *Attorney, Agent, or Firm* — Buchanan Ingersoll & Rooney PC

(57) ABSTRACT

A lift-suspended mower for an agricultural vehicle. The lift-suspended mower includes a frame, one or more cutting devices that are movably mounted with respect to the frame for cutting crop material on a ground surface, a first wheel mounted to the frame for contacting the ground surface and supporting the frame above the ground surface, and a first suspension system interconnecting the first wheel to the frame. The first suspension system includes (i) an actuator that is selectively actuable to either raise or lower to a predetermined degree the first wheel relative to the frame or vice versa, and (ii) a device for permitting the first wheel to move toward the frame when a pressure exerted by the first wheel onto the ground surface increases, wherein the device operates independently of the actuator.

13 Claims, 4 Drawing Sheets

(56)　　　　　　　References Cited

U.S. PATENT DOCUMENTS

| | | | |
|---|---|---|---|
| 2011/0197419 A1* | 8/2011 | Melone | A01D 34/64 |
| | | | 29/428 |
| 2013/0205738 A1 | 8/2013 | Walter et al. | |
| 2019/0178695 A1* | 6/2019 | Bittner | G01F 1/86 |
| 2020/0196512 A1 | 6/2020 | Deng et al. | |

* cited by examiner

TRAILED MOWER WITH STABILITY CONTROL

FIELD OF THE INVENTION

The present invention relates to a trailed mower that is connectable to a tractor or other agricultural vehicle. More specifically, the present invention relates to a stability control system for the trailed mower.

BACKGROUND OF THE INVENTION

As is described in EP Patent No. 0769895 (the '895 patent), which is incorporated by reference in its entirety and for all purposes, a trailed mower is attached to the rear end of a tractor or other agricultural vehicle. The trailed mower may also be referred to as a trail frame disc mower conditioner. The trailed mower includes a frame, one or more rotating blades for shearing crop material on the ground surface, and ground-contacting wheels/tires mounted to the left and right sides to enable transport of the mower along the ground surface. During higher speed turns or turning on hills, the center of gravity on the mower shifts, and, under some circumstances, one wheel can lift off of the ground. In extreme situations, the mower could flip over.

In view of the foregoing, it would be desirable to incorporate a stability control system into a trailed mower to either limit or prevent the mower from overturning.

SUMMARY OF THE INVENTION

According to one aspect of the invention, a lift-suspended mower for an agricultural vehicle is provided. The lift-suspended mower includes a frame, one or more cutting devices that are movably mounted with respect to the frame for cutting crop material on a ground surface, a first wheel mounted to the frame for contacting the ground surface and supporting the frame above the ground surface, and a first suspension system interconnecting the first wheel to the frame. The first suspension system includes (i) an actuator that is selectively actuable to either raise or lower to a predetermined degree the first wheel relative to the frame or vice versa, and (ii) means for permitting movement of the first wheel toward the frame when a pressure exerted by the first wheel onto the ground surface increases, said means acting independently of the actuator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figures 1, 3:
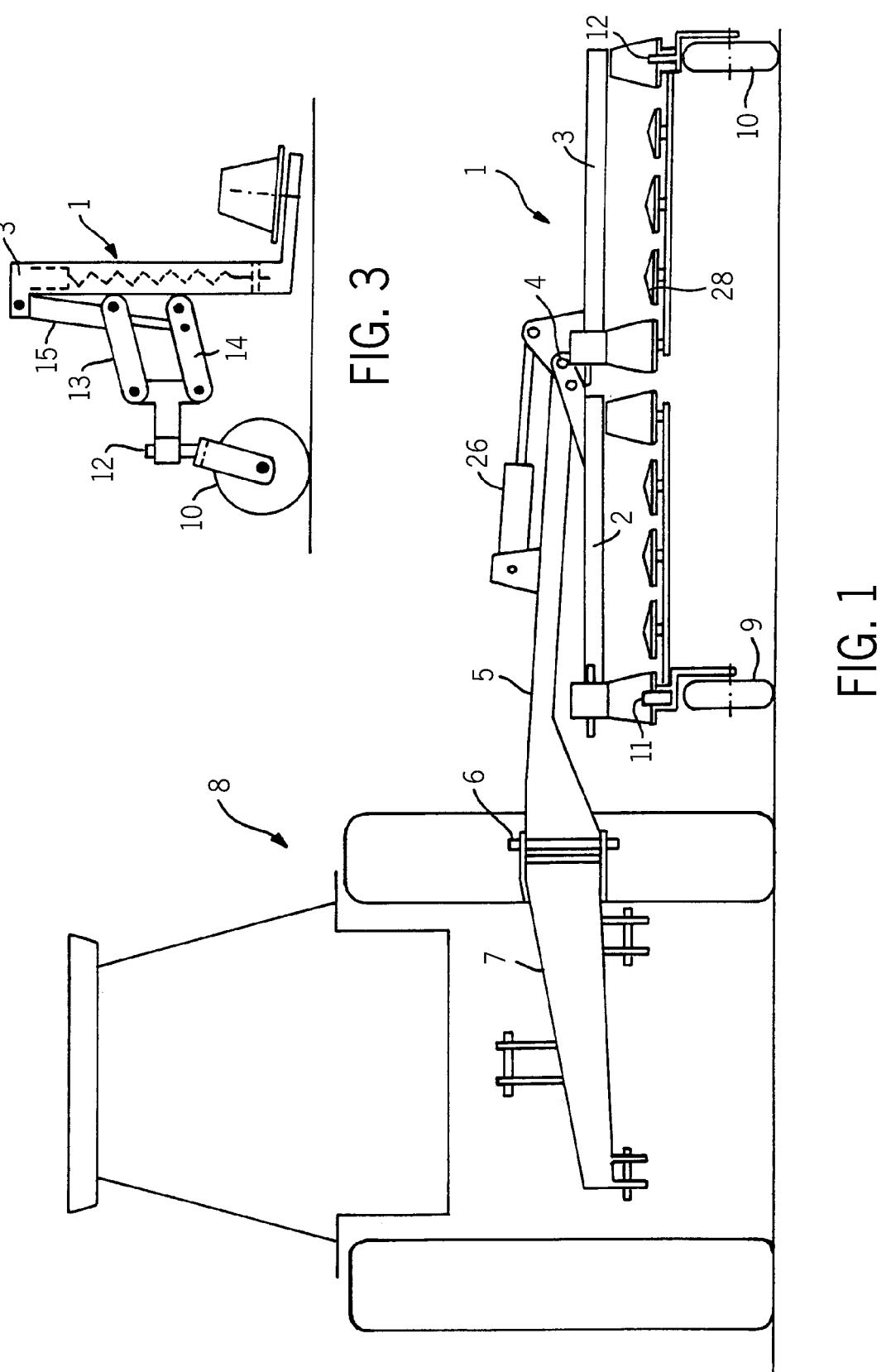
FIG. 1 shows a lift-suspended mower connected with a tractor seen from behind.
FIG. 3 shows a portion of the mower according to FIGS. 1 and 2 as seen from the right, whereby the wheels are raised (relative to FIG. 1) to a working position.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "forward", "rearward", "left" and "right", when used in connection with the tractor and/or components thereof are usually determined with reference to the direction of forward operative travel of the tractor, but again, they should not be construed as limiting. The terms "longitudinal" and "transverse" are determined with reference to the fore-and-aft direction of the tractor and are equally not to be construed as limiting.

Figure 2:
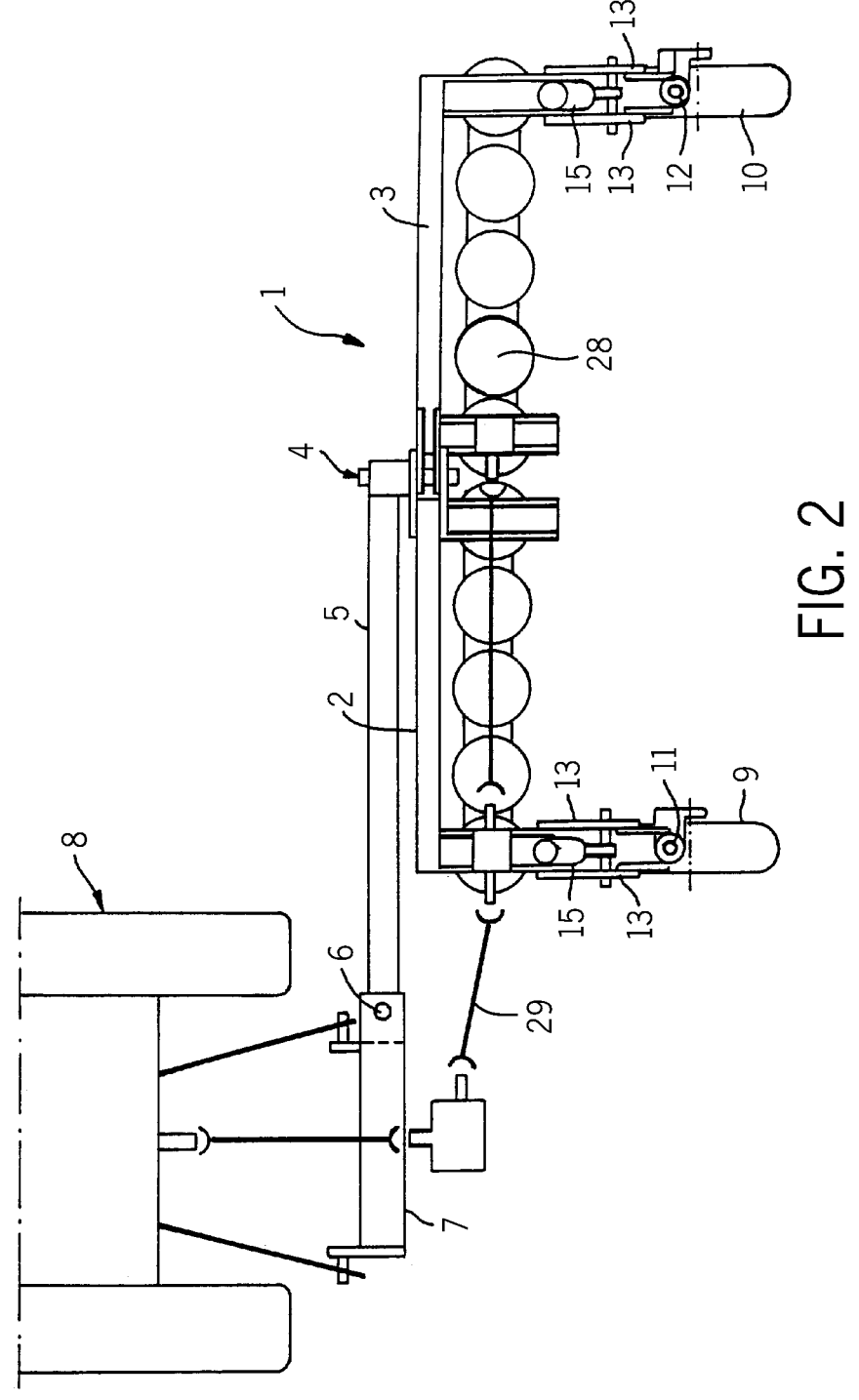
FIG. 2 shows the mower according to FIG. 1 as seen from above.

Referring now to the drawings, and more particularly to FIGS. 1-3, there is shown a lift-suspended disc mower 1 having a frame. The frame is divided into two sections each having frame bars 2,3. The bars are mutually connected by a hinge 4. The hinge 4 forms a connector that is mounted to a carrier arm 5 which is connected by a second hinge 6 to a carrier frame 7 that is suspended from the three-point suspension of a tractor 8.

The mower 1 comprises support wheels 9, 10, which may be mounted at each end of the mower frame of the mower 1. Wheels 9, 10 can rotate around an upwards directed axis 11, 12. Each support wheel 9, 10 is connected to the mower frame by a suspension system comprising a parallelogram pivot having arms 13, 14 which, in a manner known per se, is designed such that the support wheels 9, 10 are height-displaceable relative to the mower 1. Hydraulic cylinders 15 are mounted to the lower parallel arms 14 and the frame bars 2, 3. Cylinders 15 are employed for lowering and/or raising the frame of the mower 1 relative to the support wheels 9, 10 (or vice versa).

FIG. 1 shows the mower 1 raised by means of a lift system of the tractor 8 to an "elevated" vertical position that is elevated above the "working position" of the mower 1. The working position of the mower 1 is shown in FIG. 3. In this elevated position of FIG. 1, the support wheels 9, 10 are lowered with respect to the mower frame and carry at least a part of the weight of the mower 1 to reduce the moment with which the mower 1 influences the tractor 8.

The hydraulic cylinders 15 are fluidly connected with the hydraulic system of the tractor and in series with the hydraulic lift (not shown) on the tractor 8 that is used for raising and lowering the mower 1, such that the support wheels 9, 10 can be automatically lowered to the position shown in FIG. 1 (or FIG. 3) when the mower 1 is lifted by means of the lift on the tractor 8.

Hydraulic cylinders 15 may be either single or double-acting. If the hydraulic cylinders 15 are double-acting, then the frame of the mower 1 can be lowered to the working position of FIG. 3 at the same time as the lift on the tractor 8 is activated. With a single-acting hydraulic cylinder 15, the support wheels 9, 10 can, in the working position, rest against the ground under their own weight and/or be assisted by a spring.

Mower 1 is configurable between a regular use position (shown herein) and a transport position (not shown herein, but shown in the '895 patent). Specifically, the half of mower 1 including frame bar 3 is pivotable about hinge 4 to a vertical transport position by activating a hydraulic cylinder 26.

A series of rotatable blades 28 are mounted to the frame bars 2, 3 for chopping crop material, as is known in the art. The blades 28 are powered by a series of interconnected power take off shafts 29 and gear boxes that receive power from a motor of the tractor 8. Blades 28 may be more generally referred to as cutting devices. The cutting devices may vary from that which is shown, and may be, for example, rotating blades, reciprocating blades, shears, cutters, trimmers, string trimmers, scythes, choppers, and so forth.

Figures 4, 5:
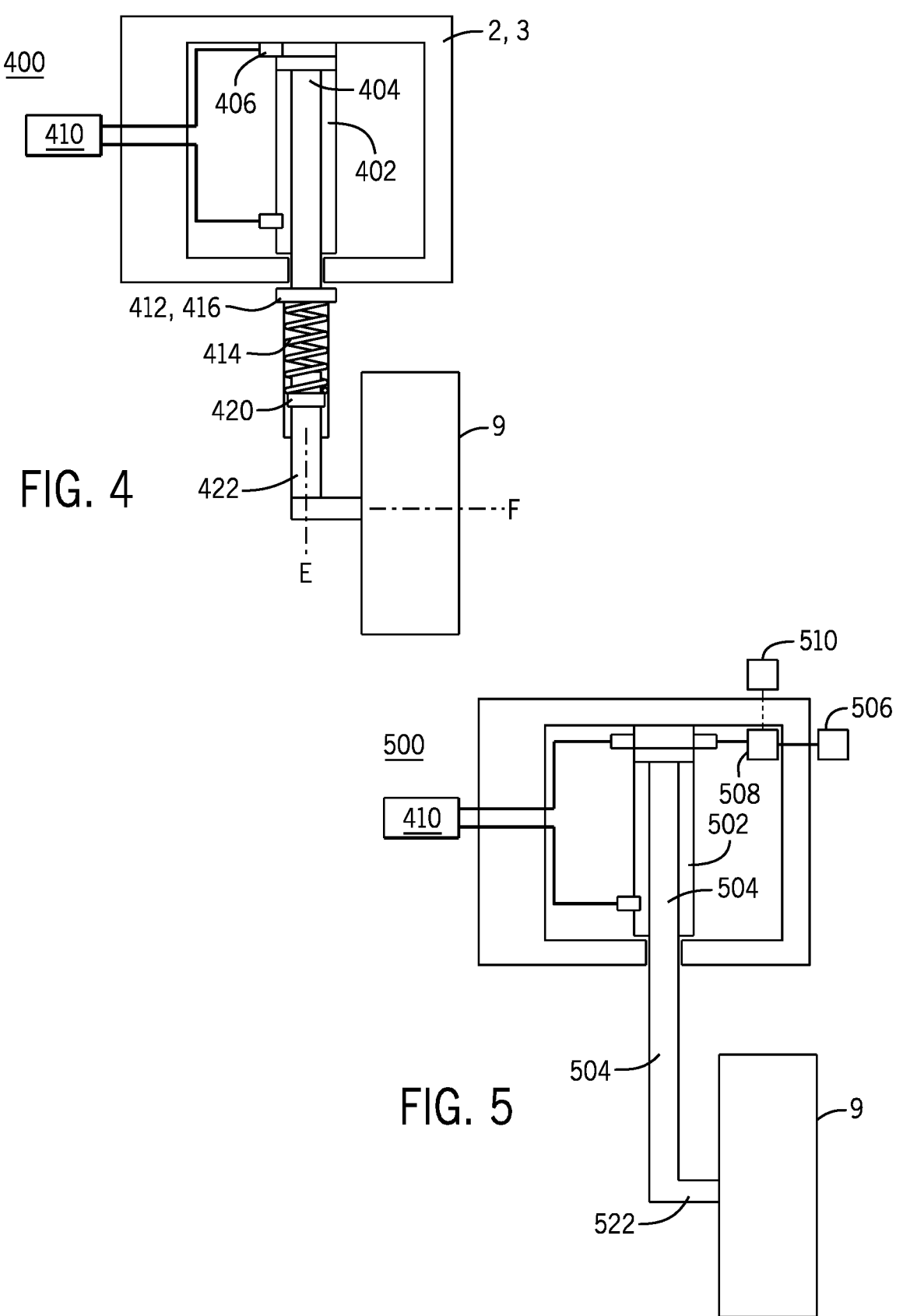
FIG. 4 depicts an alternative suspension system, which is shown schematically, for raising and lowering one support wheel of the mower.
FIG. 5 depicts another alternative suspension system, which is shown schematically, for raising and lowering one support wheel of the mower.

FIG. 4 depicts an alternative suspension system 400 of mower 1 for raising and lowering the support wheels 9, 10 of the mower 1. All of the above-described details of mower 1 apply to the system 400 of FIG. 4, unless described hereinafter. The system 400 does not include the parallelogram pivot having arms 13, 14, however, the system 400 could be modified to include such a parallelogram pivot. The wheel 9 of the system 400 is raised and lowered relative to the frame bars 2, 3 of mower 1 by actuator 402.

Actuator 402 includes a cylinder defining an interior space in which a piston 404 is positioned. Piston 404 divides the interior chamber into two sub-chambers, as is known in the art. Two fluid fittings 406 are mounted to the cylinder, each fluid fitting 406 being fluidly connected to one of the sub-chambers. The fluid fittings 406 are fluidly connected to a hydraulic system 410 of tractor 8. The hydraulic system 410 delivers fluid into one of the fluid fittings 406 to move the piston 404 within the cylinder to a predetermined position. Fluid may be delivered by system 410 to one of the fluid fittings 406 by a controller within tractor 8. The amount of fluid distributed into fittings 406 by system 410 may be controlled either manually by the operator of tractor 8 or by computer control. System 410, which is shown schematically, may include a pump, fluid reservoir, a controller, and one or more sensors. The pump may also be connected to a hydraulic actuator that is operatively coupled to carrier frame 7 for either raising or lowering that frame 7 (as well as the mower 1 connected thereto).

In FIG. 4 (as well as FIGS. 5 and 6), fluid lines are represented by bold solid lines, and electrical lines are represented by broken lines.

The housing of the actuator 402 is fixedly connected to the mower frame (e.g., one of the frame bars 2, 3). The end of the piston 404 that extends from the cylinder is connected (fixed or otherwise) to an elongated rod 412. It is noted that rod 412 may be integrated with piston 404. A compression spring 414 is positioned about the cylindrical body of the rod 412. The top end of the spring 414 is seated on a flange 416 at the top end of rod 412. The bottom end of the spring 414 is seated on a flange 420 that is fixed on a wheel hub link 422. The wheel hub link 422 is configured to translate along vertical axis E relative to rod 412. The link 422 may be positioned within an aperture formed in rod 412, or vice versa. The wheel hub link 422 is fixed to the wheel 9. It should be understood that link 422 does not rotate with wheel 9 about the horizontal axis of rotation F of the wheel 9.

In operation, during higher speed turns or turning on hills, the center of gravity on the mower shifts, and, one wheel of the two wheels tends to lift off of the ground while the other wheel of the two wheels exerts a greater force against the ground (stated differently, the ground exerts a greater upward force against the other wheel of the two wheels).

For the wheel 9 that exerts a greater force against the ground, that force causes compression of spring 414, which causes the wheel 9 to move closer to the frame 2, 3 of the mower, which results in the frame moving closer to the ground, which prevents or limits the mower from tipping over. It should be understood that the spring 414 operates independently of the actuator 402.

For the other wheel 9 that tends to lift off the ground, that wheel 9 can better maintain contact with the ground during such a high-speed turn by virtue of the spring 414 that urges wheel 9 in a direction toward the ground in the absence of any force between the wheel and the ground.

Spring 414 provides a passive solution to the problem described in the background section because spring 414 does not require intervention by either an operator or a computer.

Although one system 400 for raising and lowering support wheel 9 is shown, it should be understood that a similar system 400 is provided for raising and lowering the other support wheel 10. Independent control of the left and right wheels 9, 10 compensates for the shift in center of gravity during high speed turns or turns on side hills.

FIG. 5 depicts another alternative suspension system 500 for raising and lowering the support wheels 9, 10 of the mower 1. The system 500 is similar to the system 400, and only the differences therebetween will be described.

Actuator 502 includes an elongated piston rod 504 that is coupled (fixed or otherwise) to the wheel hub link 522. In lieu of spring 414, system 500 includes a pressure accumulator 506 that is fluidly coupled to the top sub-chamber of actuator 502 by way of an adjustable valve 508. Valve 508 may be controlled by a controller that receives signals from a sensor 510, or valve 508 may be manually controlled by an operator.

Sensor 510 may be a rotation sensor (e.g., rotary position sensor, potentiometer, etc.) that is positioned on carrier arm 5 or carrier frame 7. Sensor 510 senses rotation of carrier arm 5 and/or carrier frame 7, due to turning of the tractor, which will result in the turning action of mower 1. Alternatively, sensor 510 may represent the steering angle sensor of tractor 8. As another alternative, sensor 510 for each of wheels 9 and 10 may be a fluid pressure sensor that is in fluid communication with one of the sub-chambers of the actuator 502 for that wheel; and the controller may be in electrical communication with both sensors 510 (i.e., for wheels 9 and 10), such that the controller identifies a turning event by virtue of a pressure imbalance reported by the two sensors for wheels 9 and 10.

In an event where sensor 510 senses a turning event, for the wheel 9 that either exerts or will soon exert a greater force against the ground (e.g., the wheel on the outside of a turn), the controller opens valve 508, which causes the fluid residing in the upper chamber of actuator 502 to flow through the open valve 508 and into the pressure accumulator 506, which results in the pressure-balanced piston 504 moving upward, which results in the wheel link 522 and its wheel 9 moving upwardly toward the mower housing. Upward movement of the wheel 9 either limits or prevents the mower from tipping over, as explained above. When the sensor 510 no longer senses the turning event and the increased pressure between the wheel 9 and the ground subsides, the fluid within accumulator 506 will flow back into the upper chamber of actuator 502 under the control of the accumulator 506. The controller then closes the valve 508.

The movable valve 508 provides an active solution to the problem described in the background section because valve 508 requires intervention by either an operator or a computer.

Figure 6:
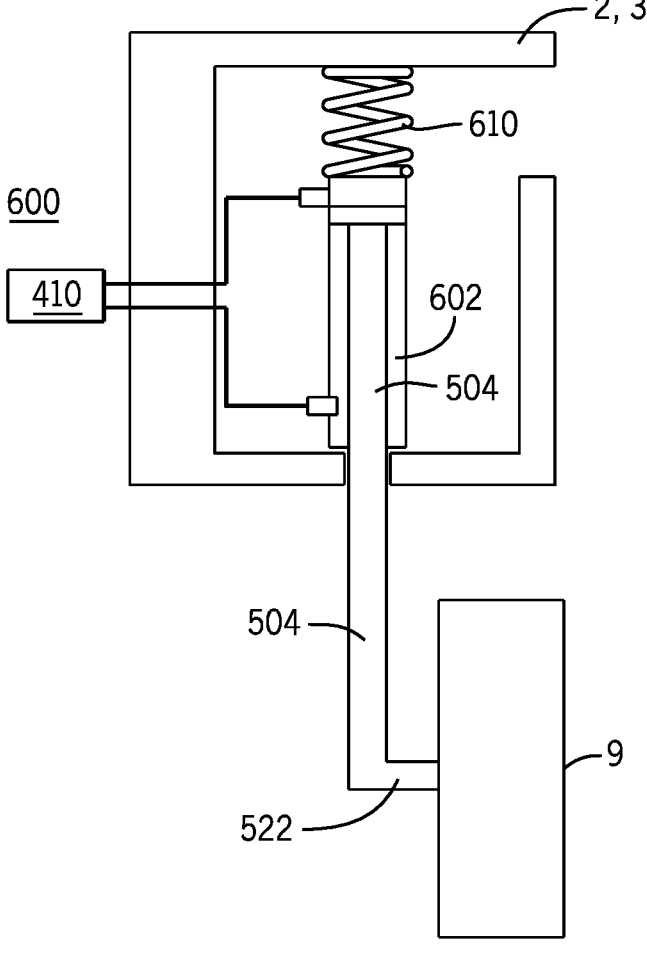
FIG. 6 depicts yet another alternative suspension system, which is shown schematically, for raising and lowering one support wheel of the mower.

FIG. 6 depicts another alternative suspension system 600 for raising and lowering the support wheels 9, 10 of the mower 1. The system 600 is similar to the systems 400 and 500, and only the differences therebetween will be described.

Actuator 602 includes an elongated piston rod 504 that is coupled (fixed or otherwise) to the wheel hub link 522. The top end of housing of actuator 602 is mounted to the mower frame by a compression spring 610. Unlike the other actuators described herein, the actuator 602 can float relative to the mower frame.

In operation, for the wheel 9 that exerts a greater force against the ground, that force causes upward movement of actuator 602 against the force of compression spring 610, which results in compression of spring 610, which causes the wheel 9 to move closer to the frame 2, 3 of the mower, which results in the frame moving closer to the ground, which prevents or limits the mower from tipping over. The spring 610 operates independently of the actuator 602.

Spring 610 provides a passive solution to the problem described in the background section because spring 610 does not require intervention by either an operator or a computer.

Each of (i) the combined accumulator 506 and valve 508, (ii) the spring 414, and (iii) the spring 610 may be considered as a means for automatically permitting movement of the wheel toward the frame when a pressure exerted by the wheel onto the ground surface increases. Other means are envisioned such as a diaphragm, pressurized chamber, tension spring, solenoid, electromagnet, and so forth.

According to one aspect of the invention, operation of the actuator 402/502 is controlled by an operator of the mower 1, whereas the means 506/508/414/610 acts independently of the operator.

While this invention has been described with respect to at least one embodiment, the present invention can be further modified within the spirit and scope of this disclosure. For example, the hydraulic actuators described herein may replaced by electric actuators comprising a movable (e.g., translatable) piston/shaft/arm that is capable of translating the wheel hub link. The electric actuator could be a linear actuator or a solenoid, for example.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lift-suspended mower for an agricultural vehicle, said lift-suspended mower comprising:

a frame;

one or more cutting devices that are movably mounted with respect to said frame for cutting crop material on a ground surface;

a first wheel mounted to said frame for contacting the ground surface and supporting the frame above the ground surface; and a first suspension system interconnecting the first wheel to the frame, the first suspension system including (i) an actuator that is selectively actuable to either raise or lower to a predetermined degree the first wheel relative to the frame or vice versa, and (ii) means for permitting movement of the first wheel toward the frame when a pressure exerted by the first wheel onto the ground surface increases, said means operating independently of the actuator, wherein the means comprises a compression spring that is configured to compress when pressure exerted by the first wheel onto the ground surface increases, and without causing actuation of the actuator, wherein the first wheel is connected to a wheel hub link, and the compression spring is configured to bias the wheel hub link away from a piston of the actuator, wherein the compression spring bears on a collar of the wheel hub link and a collar of either the piston or a rod that is connected to the piston.

2. The lift-suspended mower of claim 1, wherein operation of the actuator is controlled by an operator of the mower, whereas the means acts independently of the operator.

3. The lift-suspended mower of claim 1, wherein the cutting device is a rotatable blade.

4. An agricultural vehicle comprising the lift-suspended mower of claim 1.

5. The agricultural vehicle of claim 4, wherein the agricultural vehicle is a tractor.

6. A lift-suspended mower for an agricultural vehicle, said lift-suspended mower comprising:

a frame;

one or more cutting devices that are movably mounted with respect to said frame for cutting crop material on a ground surface;

a first wheel mounted to said frame for contacting the ground surface and supporting the frame above the ground surface; and a first suspension system interconnecting the first wheel to the frame, the first suspension system including (i) an actuator that is selectively actuable to either raise or lower to a predetermined degree the first wheel relative to the frame or vice versa, and (ii) means for permitting movement of the first wheel toward the frame when a pressure exerted by the first wheel onto the ground surface increases, said means operating independently of the actuator, wherein the means comprises a compression spring that is configured to compress when pressure exerted by the first wheel onto the ground surface increases, and without causing actuation of the actuator, wherein the compression spring is mounted between a housing of the actuator and the frame of the mower.

7. The lift-suspended mower of claim 6 wherein the frame includes a connector for connecting to a mating connector on an agricultural vehicle.

8. The lift-suspended mower of claim 7, wherein the connector is pivotably connected with respect to the mating connector.

9. The lift-suspended mower of claim 6, wherein the actuator is a hydraulic actuator.

10. The lift-suspended mower of claim 6, wherein operation of the actuator is controlled by an operator of the mower, whereas the means acts independently of the operator.

11. The lift-suspended mower of claim 6, wherein the cutting device is a rotatable blade.

12. An agricultural vehicle comprising the lift-suspended mower of claim 6.

13. The agricultural vehicle of claim 12, wherein the agricultural vehicle is a tractor.

\* \* \* \* \*